(12) United States Patent
Smith et al.

(10) Patent No.: US 7,673,417 B2
(45) Date of Patent: Mar. 9, 2010

(54) METHOD FOR SELF-ORIENTING A PLANTING POT ON A TRAY

(76) Inventors: Thomas J. Smith, 1015 Indian Trails Rd., Carleton, MI (US) 48117; Henry L. Huntington, 7316 Pleasant St., Loudon, NH (US) 03307

( * ) Notice: Subject to any disclaimer, the term of this patent is extended or adjusted under 35 U.S.C. 154(b) by 0 days.

(21) Appl. No.: 12/179,827

(22) Filed: Jul. 25, 2008

(65) Prior Publication Data

US 2008/0276528 A1 Nov. 13, 2008

Related U.S. Application Data

(62) Division of application No. 10/423,476, filed on Apr. 25, 2003, now Pat. No. 7,454,864.

(51) Int. Cl.
*A01G 9/02* (2006.01)
(52) U.S. Cl. ............................... 47/66.7; 47/66.5; 47/87
(58) Field of Classification Search ................ 47/66.5, 47/66.6, 66.1, 65.9, 73, 75, 77
See application file for complete search history.

(56) References Cited

U.S. PATENT DOCUMENTS

| | | | |
|---|---|---|---|
| D20,336 | S | 11/1890 | Whilldin |
| 1,057,877 | A | 4/1913 | Peeples |
| 1,391,353 | A | 9/1921 | Wells |
| 1,606,523 | A | 11/1926 | Gardner |
| D85,969 | S | 1/1932 | Siciliani |
| 1,850,369 | A | 3/1932 | Andrews |
| 1,904,788 | A | 4/1933 | Holmes |
| 2,661,574 | A | 12/1953 | Ritter |
| 2,700,847 | A | 2/1955 | Brasol |

(Continued)

FOREIGN PATENT DOCUMENTS

CA 104670 7/2005

(Continued)

OTHER PUBLICATIONS

U.S. Appl. No. 29/307,410, Title: "Plant Pots and Tray Combination," Filed: Apr. 18, 2008 (9 pages).

(Continued)

*Primary Examiner*—Michael R Mansen
*Assistant Examiner*—Monica L Williams
(74) *Attorney, Agent, or Firm*—McCarter & English, LLP

(57) ABSTRACT

Planting pots and a multi-compartment tray are provided, the pots and tray having a self-orienting configuration for urging the pots into proper alignment when same are placed within compartments of the tray. The pots include angled recesses disposed radially about the bottom portion of the pots. The compartments of the tray include angled protrusions disposed radially about the bottom portion of the compartment. The angled recesses of the pot engage with the angled protrusions of the compartment when the pot is placed in the compartment to urge the pot into proper alignment. A plurality of slots are included along an upper portion of each pot for allowing optional identification tags to be inserted thereinto. The identification tags, in addition to logos, artwork, or other indicia, if included, are positioned by the self-orienting configuration of the pots and tray to face in a desired direction.

13 Claims, 8 Drawing Sheets

U.S. PATENT DOCUMENTS

| | | |
|---|---|---|
| 3,142,133 A | 7/1964 | Brooks |
| 3,762,097 A | 10/1973 | Gallo |
| 3,825,126 A | 7/1974 | Pohl et al. |
| 3,852,912 A | 12/1974 | Diller |
| 3,866,351 A | 2/1975 | Cobia |
| D235,909 S | 7/1975 | Insalaco |
| 3,896,587 A | 7/1975 | Insalaco |
| 3,951,259 A | 4/1976 | Oglesbee |
| 3,966,043 A | 6/1976 | Devroe |
| D243,112 S | 1/1977 | Gross |
| 4,050,579 A | 9/1977 | Gorski et al. |
| 4,057,931 A | 11/1977 | Stutelberg et al. |
| 4,160,342 A | 7/1979 | Dryer |
| 4,167,080 A | 9/1979 | Mickelson |
| 4,173,097 A | 11/1979 | Staby |
| D255,410 S | 6/1980 | Petruzzi et al. |
| 4,242,834 A | 1/1981 | Olsen |
| 4,296,569 A | 10/1981 | Edwards |
| 4,315,382 A | 2/1982 | Kay et al. |
| 4,407,092 A | 10/1983 | Ware |
| 4,495,725 A | 1/1985 | Talbott |
| 4,528,774 A | 7/1985 | Skaife |
| 4,567,981 A | 2/1986 | Headon |
| 4,618,069 A | 10/1986 | Quong |
| 4,658,542 A | 4/1987 | Holmberg |
| 4,700,837 A | 10/1987 | Hammett |
| 4,739,581 A | 4/1988 | Jarvis |
| 4,759,451 A | 7/1988 | Apps |
| 4,887,388 A | 12/1989 | Waltel, Jr. |
| D305,738 S | 1/1990 | Day |
| 4,911,300 A | 3/1990 | Colonna |
| 4,928,841 A * | 5/1990 | Arthurs ...................... 220/516 |
| 4,941,572 A | 7/1990 | Harris |
| 4,962,855 A | 10/1990 | Holmquist |
| 5,022,183 A * | 6/1991 | Bohlmann ...................... 47/86 |
| D322,707 S | 12/1991 | Iverson |
| D323,415 S | 1/1992 | Iverson |
| D323,416 S | 1/1992 | Iverson |
| 5,117,581 A | 6/1992 | Green et al. |
| 5,141,149 A | 8/1992 | Fulton |
| 5,180,052 A | 1/1993 | Smith et al. |
| 5,315,786 A | 5/1994 | Smith et al. |
| 5,327,679 A | 7/1994 | Hawthorne |
| D349,615 S | 8/1994 | McLaughlin |
| 5,353,930 A | 10/1994 | Berry, Jr. |
| 5,461,825 A | 10/1995 | Daimon et al. |
| 5,481,825 A | 1/1996 | Aoyama |
| D381,600 S | 7/1997 | Yurkovic |
| 5,644,867 A | 7/1997 | Gay |
| 5,649,386 A | 7/1997 | Rynberk |
| 5,797,495 A | 8/1998 | Lerrick |
| 5,860,526 A | 1/1999 | Burke, Jr. |
| D409,946 S | 5/1999 | Hensen |
| 5,953,859 A | 9/1999 | Cochran et al. |
| D419,483 S | 1/2000 | McGuire |
| 6,085,460 A | 7/2000 | Jackson |
| 6,134,832 A | 10/2000 | Bokmiller et al. |
| 6,199,319 B1 * | 3/2001 | Skinner ...................... 47/66.6 |
| 6,269,964 B1 | 8/2001 | Turner, Jr. |
| D452,150 S | 12/2001 | Viner |
| 6,339,899 B1 | 1/2002 | Lehmann |
| D453,309 S | 2/2002 | Katz et al. |
| 6,367,645 B1 | 4/2002 | Trygg |
| 6,378,723 B1 | 4/2002 | Casey |
| 6,381,901 B1 | 5/2002 | Friedman |
| D460,590 S | 7/2002 | Hodge et al. |
| 6,510,653 B1 | 1/2003 | Workum et al. |
| 6,526,693 B2 | 3/2003 | Cochran |
| 6,536,361 B1 | 3/2003 | Wu |
| 6,634,306 B1 | 10/2003 | Faulring |
| 6,779,300 B2 | 8/2004 | Tagawa et al. |
| 6,851,221 B2 | 2/2005 | Layt et al. |
| D502,669 S | 3/2005 | Smith et al. |
| 6,918,206 B2 | 7/2005 | Schuck |
| 7,454,864 B2 | 11/2008 | Smith et al. |
| D598,809 S | 8/2009 | Smith et al. |
| 2001/0054570 A1 | 12/2001 | Danko |
| 2002/0007593 A1 | 1/2002 | Mischo |
| 2002/0066227 A1 | 6/2002 | Wood-Phillips |
| 2003/0029087 A1 | 2/2003 | Tagawa et al. |
| 2003/0183140 A1 | 10/2003 | Layt |
| 2003/0209552 A1 | 11/2003 | Leibner et al. |
| 2004/0111967 A1 | 6/2004 | Raap et al. |
| 2005/0257425 A1 | 11/2005 | Wetering |
| 2007/0017153 A1 | 1/2007 | Meyer |
| 2008/0155898 A1 | 7/2008 | Wetering et al. |
| 2008/0276530 A1 | 11/2008 | Trabka |
| 2008/0276531 A1 | 11/2008 | Smith et al. |
| 2009/0260285 A1 | 10/2009 | Smith et al. |

FOREIGN PATENT DOCUMENTS

| | | |
|---|---|---|
| CA | 111697 | 7/2005 |
| EP | 0724826 A1 | 8/1996 |
| FR | 2649582 | 1/1991 |
| GB | 2060342 | 5/1981 |
| GB | 2069804 | 9/1981 |
| GB | 2263052 | 7/1993 |
| JP | 51-115145 | 10/1976 |
| JP | 58-146447 | 10/1983 |
| JP | 61-148161 | 9/1986 |
| JP | 1-74743 | 5/1989 |
| JP | 05-076247 | 3/1993 |
| JP | 5-308853 | 11/1993 |
| JP | 6-61042 | 8/1994 |
| JP | 7-7372 | 2/1995 |
| JP | 9-20366 | 1/1997 |
| JP | 10-178919 | 7/1998 |
| JP | 2001-136835 | 5/2001 |
| JP | 2002-45046 | 2/2002 |
| WO | WO 9319446 | 9/1993 |
| WO | WO 2004/095905 A2 | 11/2004 |

OTHER PUBLICATIONS

U.S. Appl. No. 12/058,701, Title: "Open Bottom Planting Pot With Releasable Bottom Cover," Filed: Mar. 29, 2008 (45 pages).

International Search Report of the International Searching Authority mailed Jan. 4, 2005, issued in connection with International Patent Appln. No. PCT/US03/36972 (3 pages).

Dillen Products, Co. Ltd., Middlefield, Ohio 44062, 4 1/2-8-4 1/2 IST Tray and 4 1/2 Geranium Pot (2 pages photos).

Landmark Plastic Corporation, Akron, Ohio, 44306, One Quart Transport Tray, 6 count (X-QTTP6AB-N) (1 page).

Office Action from Japanese Patent Application No. JP2004-571472 with English translation dated Apr. 24, 2007 (10 pages).

Decision of Rejection from Japanese Patent Application No. JP2004-571472 with English translation dated Nov. 6, 2007 (5 pages).

European Search Report dated Jan. 15, 2008, in connection with European Application No. EP 03 78 6851 (3 pages).

Communication Pursuant to Article 94(3) EPC dated Mar. 27, 2008, in connection with European Application No. EP 03 78 6851 (7 pages).

Notice of Allowance dated Sep. 16, 2008, from issued U.S. Patent No. 7,454,864 (7 pages).

Notice of Allowance dated Apr. 17, 2008, from issued U.S. Patent No. 7,454,864 (9 pages).

Notice of Allowance dated Jan. 8, 2008, from issued U.S. Patent No. 7,454,864 (12 pages).

Notice of Allowance dated Oct. 22, 2007, from issued U.S. Patent No. 7,454,864 (10 pages).

Interview Summary dated Jun. 27, 2007, from issued U.S. Patent No. 7,454,864 (3 pages).

Office Action dated Mar. 20, 2007, from issued U.S. Patent No. 7,454,864 (6 pages).

Advisory Action dated Dec. 1, 2006, from issued U.S. Patent No. 7,454,864 (4 pages).
Office Action dated Jun. 6, 2006, from issued U.S. Patent No. 7,454,864 (10 pages).
Office Action dated Dec. 5, 2005, from issued U.S. Patent No. 7,454,864 (8 pages).
Office Action dated Mar. 24, 2005, from issued U.S. Patent No. 7,454,864 (9 pages).
Office Action dated Jul. 19, 2004, from issued U.S. Patent No. 7,454,864 (14 pages).
Office Action dated Apr. 13, 2004, from issued U.S. Patent No. 7,454,864 (6 pages).
Office Action dated Jan. 29, 2004, from issued U.S. Patent No. D502,669 (7 pages).
Notice of Allowance dated Oct. 1, 2004, from issued U.S. Patent No. D502,669 (12 pages).
Communication Pursuant to Article 94(3) EPC dated Jan. 20, 2009, in connection with European Application No. EP 03 78 6851 (4 pages).
Office Action dated Dec. 30, 2008, from pending U.S. Appl. No. 12/179,876 (10 pages).
Notice of Allowance dated Jan. 6, 2009, from pending U.S. Appl. No. 29/307,410 (9 pages).
Notice of Allowance dated Apr. 6, 2009, from pending U.S. Appl. No. 29/307,410 (15 pages).
U.S. Appl. No. 12/148,348, Title: "Self-Orientating Plant Pot and Tray System," Filed: Apr. 18, 2008 (32 pages).
Office Action dated Jul. 23, 2009, from pending U.S. Appl. No. 12/179,876 (19 pages).
Supplemental Notice of Allowability dated May 7, 2009, from pending U.S. Appl. No. 29/307,410 (4 pages).
Examiner's Report from Australian Patent Application No. 2003295650 dated Jun. 12, 2009 (2 pages).
Interview Summary dated Sep. 15, 2009, from pending U.S. Appl. No. 12/179,876 (5 pages).
Office Action dated Oct. 27, 2009, from pending U.S. Appl. No. 12/148,348 (15 pages).

* cited by examiner

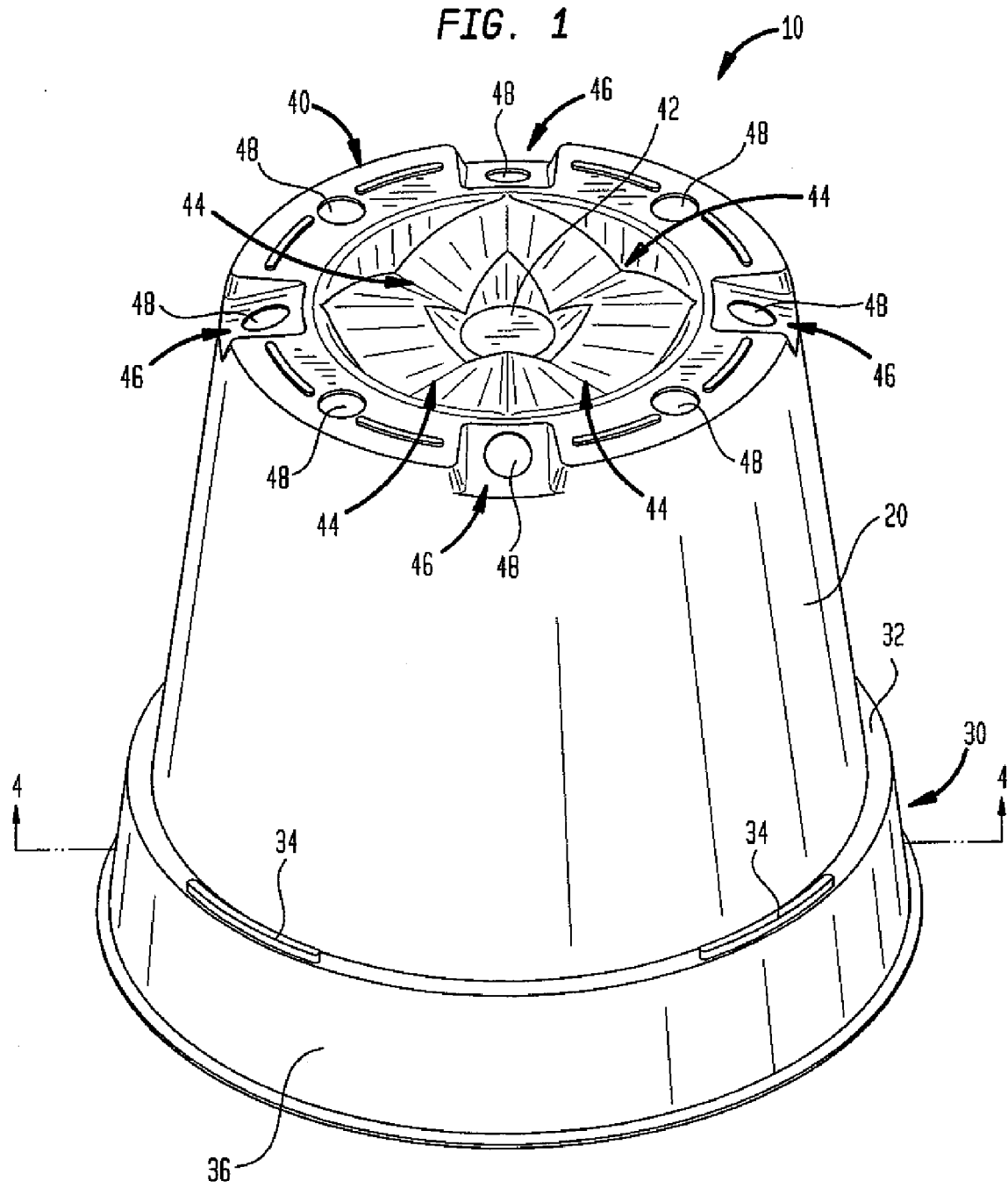

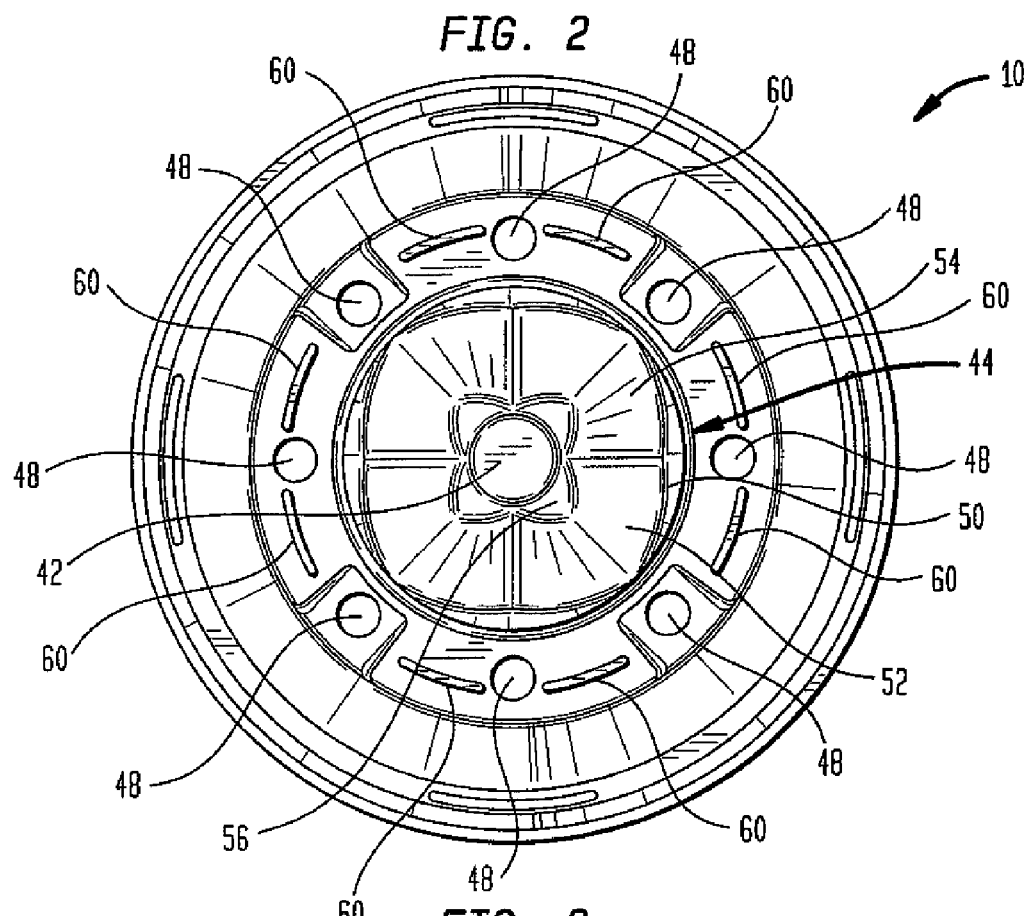
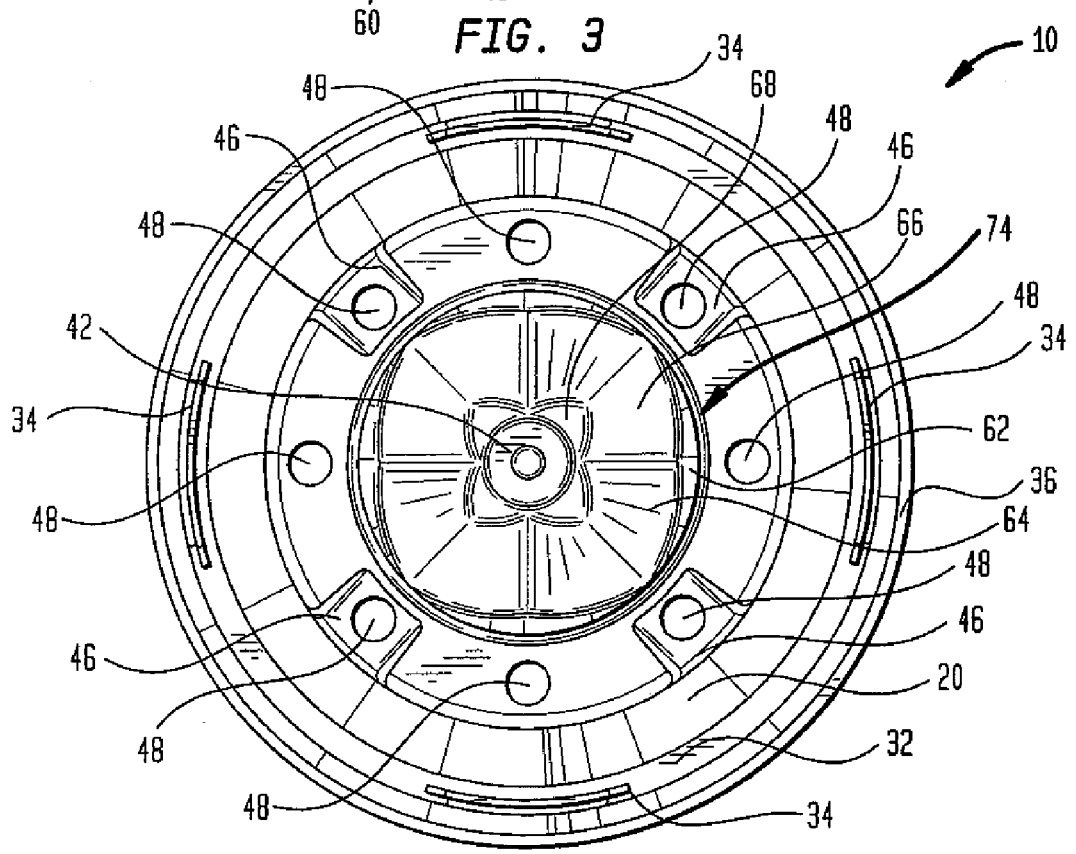

METHOD FOR SELF-ORIENTING A PLANTING POT ON A TRAY

RELATED APPLICATIONS

This application is a divisional application of U.S. patent application Ser. No. 10/423,476, filed Apr. 25, 2003, now U.S. Pat. No. 7,454,864, the entire disclosure of which is expressly incorporated herein by reference.

BACKGROUND OF THE INVENTION

1. Field of the Invention

The present invention relates to planting pots and a multi-compartment tray for holding same. More specifically, the present invention relates to planting pots and a multi-compartment tray having matching self-orienting configurations for aligning and locking the pots into position in the tray and for automatically orienting tags and other indicia in a uniform direction.

2. Related Art

Planting pots come in a variety of designs and configurations. Such pots are frequently used to plant flowers, vines, small shrubbery, and other types of plants. Often, planting pots include apertures located on the bottom portion thereof to allow drainage of water from soil packed into the pot and to allow aeration. Additionally, planting pots are often manufactured of lightweight, plastic materials that are suitable for temporary use by garden centers, gardeners, and the like.

It is known to provide trays for allowing a plurality of planting pots to be stored therein and carried thereby. Such trays allow a plurality of pots to be conveniently transported from one location to another, and also allow for plants of similar types to be grouped together. Further, pot trays are often used in combination with identification tags attached to portions of the pots to allow for quick grouping and identification of plants.

A particular problem with existing planting pots, and trays used therewith, is that the pots are not capable of being automatically aligned and oriented when placed in trays. For example, when pots are provided with identification tags and are placed in the trays, one must manually shift the pots to orient same so that the identification tags are all facing in a desired direction. Moreover, even if identification tags are not used with the pots, existing pots require manual adjustment to properly orient the pots within the storage compartments of trays. Further, if indicia (e.g., logos or advertisements) are included on the pots, the pots must be manually configured to orient the indicia in a uniform direction and/or to improve visibility of same.

Accordingly, what would be desirable, but has not heretofore been provided, is a multi-compartment tray and planting pots having a self-orienting configuration that automatically aligns and orients the pots when same are placed within the compartments of the tray.

SUMMARY OF THE INVENTION

The present invention relates to planting pots and a multi-compartment tray, both having a self-orienting configuration for urging the pots into proper alignment when same are placed within the compartments of the tray. Each of the pots comprises an upper portion, a body portion, and a bottom portion. The bottom portion includes a center portion and a plurality of alignment recesses disposed radially about the center portion. Each of the plurality of alignment recesses include angled surfaces for co-acting with the angled surfaces on the tray for urging the pot into a desired orientation when the pot is placed on the tray. A plurality of apertures are provided on the bottom portion for allowing drainage of water from soil in the pot and for providing aeration. Rails may be provided on the bottom portion for maintaining the pot a distance above the tray to allow water to drain from the apertures when the pot is positioned on the tray. The upper portion includes a plurality of slots that allow optional identification tags to be inserted therein for identifying the type of plant in the pot. The identification tags, if provided, are oriented in a uniform direction when the pots are aligned on the tray.

A multi-compartment tray is provided for holding a plurality of planting pots. Each compartment of the tray includes an upper portion, a bottom portion, and a compartment wall therebetween. The bottom portion of each compartment includes a plurality of alignment protrusions disposed radially about a central portion. The alignment protrusions include angled surfaces that co-act with the angled surfaces of the alignment recesses of the pot to urge the pot into a desired orientation when the pot is placed in the compartment. A plurality of bevels located near the upper portion provide room for allowing insertion of the optional identification tags into the slots of the pots when the pots are positioned in the tray.

BRIEF DESCRIPTION OF THE DRAWINGS

These and other important objects and features of the invention will be apparent from the following Detailed Description of the Invention, taken in connection with the accompanying drawings, in which:

FIG. 1 is an isometric view of a planting pot according to the present invention.

FIG. 2 is a bottom view of the planting pot of FIG. 1.

FIG. 3 is a top view of the planting pot of FIG. 1.

DETAILED DESCRIPTION OF THE INVENTION

Figure 4:
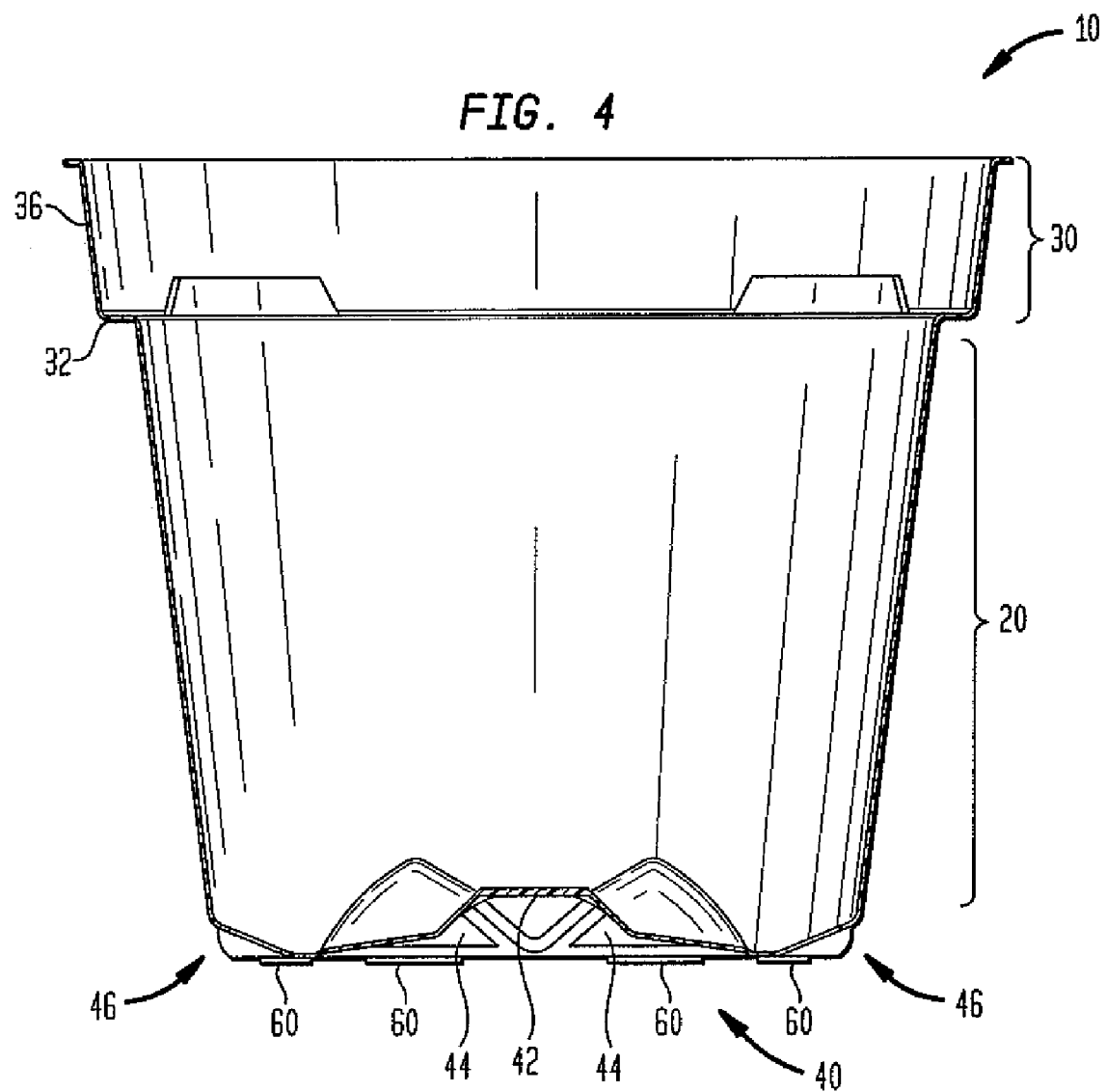
FIG. 4 is a cross-sectional view of the planting pot of the present invention, taken along the line 4-4 of FIG. 1.

The present invention relates to planting pots and a multi-compartment tray, each having a self-orienting configuration for urging the pots into proper alignment when same are placed within the compartments of the tray. The planting pots include angled recesses disposed radially about the bottom portion of the pots. The compartments of the tray include angled protrusions disposed radially about the bottom portion of the compartment. The angled recesses of the pot engage with the angled protrusions of the compartment when the pot is placed in the compartment to urge the pot into proper alignment. One or more slots may be included along an upper portion of each pot for allowing optional identification tags to be inserted thereinto. The identification tags, if included, are positioned by the self-orienting configuration of the pots and tray to face in a desired direction.

Referring now to the drawings, FIG. 1 is an isometric view of a planting pot, generally indicated at 10, according to the present invention. The pot 10 comprises a body portion 20, an upper portion 30, and a bottom portion 40, forming a pot of a conventional shape as is known in the art. The upper portion 30 is connected to the body portion 20 by a shoulder 32, and includes a rim 36 connected to the shoulder 32. The upper portion 30 could include one or more slots 34 extending through the shoulder 32 for allowing identification tags to be inserted therethrough for identifying the type of plant contained in pot 10. Any number of slots and identification tags can be provided.

The bottom portion 40 comprises a number of features that allow the pot 10 to be self-oriented when placed in a storage tray, such as the multi-compartment tray of the present invention discussed herein. A central portion 42 is disposed on the bottom portion 40, about which a plurality of alignment recesses 44 are disposed radially on the bottom portion 40 of the pot. As will be discussed in greater detail below with reference to FIGS. 2-4, the alignment recesses 44 are generally triangular in shape, and include angled and radial surfaces that co-act with alignment protrusions of the multi-compartment tray of the present invention to urge the pot 10 to rotate into proper alignment. A plurality of bevels 46 are provided near the circumference of the bottom portion 46 and include drainage apertures 48 to ensure proper drainage of water and other liquids from the pot 10 and to provide aeration of soil contained within the pot 10. Additionally, the apertures 48 are disposed about the flat surfaces of the bottom portion 40. Any configuration of the bevels 46 and drainage apertures 48 are considered within the scope of the present invention.

FIG. 2 is a bottom view of the planting pot 10 of the present invention. As mentioned previously, the bottom portion 40 of the pot 10 includes a plurality of alignment recesses 44 disposed radially about the central portion 42 that co-act with alignment protrusions on the tray to urge the pot 10 into proper alignment. Each of the alignment recesses 40 include angled surfaces 52 and 54, in addition to a radial surface 50, that are joined at edges to form a tapered or generally triangular configuration. Second radial surfaces 56 join the edges of the alignment recesses 44 to the circumference of the central portion 42. When the pot 10 is positioned in a compartment of a tray having alignment protrusions matching the alignment recesses 44, if the pot is not perfectly aligned, the weight of the pot 10 (or its contents) causes the surfaces 50, 52, and 54 to slide against the alignment protrusions, imparting a rotational force on the pot 10 as the pot moves downward. This rotational force urges the pot 10 into proper alignment, thus self-orienting the pot 10 when it is placed in the tray.

Optionally, a plurality of rails 60 can be provided on the bottom portion 40 to suspend the bottom portion 40 of the pot 10 a desired distance above a surface (e.g., above the bottom of a tray container). This prevents the apertures 48 of the pot 10 from being blocked, allowing drainage and aeration when the pot is in place. The rails 60 could be of any desired height and configuration.

FIG. 3 is a top view of the planting pot 10 of the present invention. The body portion 20 of the pot 10 defines a cavity wherein soil and plants can be potted, as with conventional pots. The view of the bottom portion includes the same features as shown in the bottom view of FIG. 2, though a recess shown in FIG. 2 is a protrusion in FIG. 3. Thus, a plurality of protrusions 74 are formed by angled surfaces 64 and 66, and radial surface 62. The angled surfaces 64 and 66 and radial surface 62 are joined at edges to define generally triangular-shaped protrusions.

The shoulder 32 of the pot 10 may includes one or more slots 34 for allowing identification tags to be inserted therein. The identification tags can rest against the rim 36 of the pot 10 after insertion into the slots 34, allowing viewing from desired angles. Preferably, when a plurality of pots are provided, tags are inserted into one or more desired slots 34, and when the pots are positioned in a multi-compartment tray and are self-oriented, the tags are automatically positioned to face in a uniform direction. This obviates the need to individually position each pot to face the tags in the same direction. Additionally, indicia included on the sides of the pots, such as artwork, text, logos, or other indicia, are automatically configured to face in a uniform direction, without requiring human intervention.

FIG. 4 is a cross-sectional view of the planting pot of the present invention, taken along the line 4-4 of FIG. 1. The entire pot 10 is preferably formed in a single, unitary construction of plastic typically utilized to manufacture conventional planting pots. The alignment recesses 44 can be formed using any suitable manufacturing process, such as molding. Any material can be utilized to form the planting pots and multi-compartment tray of the present invention, including, but not limited to, plastic or other polymeric material.

Figure 5:
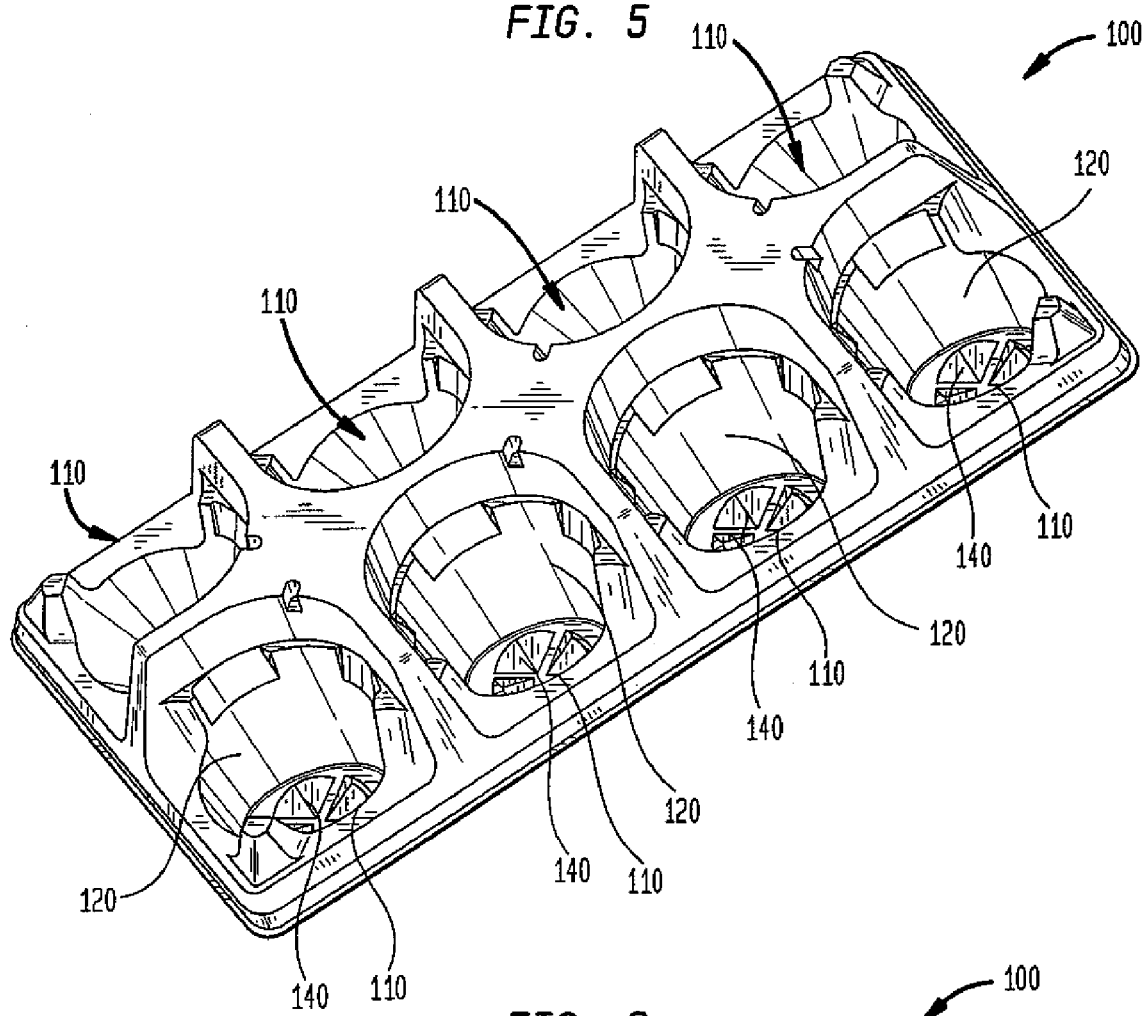
FIG. 5 is an isometric view of the multi-compartment tray of the present invention.

FIG. 5 is an isometric view of the multi-compartment tray of the present invention, indicated generally at 100. The tray 100 comprises a plurality of compartments 110 for storing pots, such as the planting pot 10 of the present invention. The compartments 110 each comprise a body portion 120 and a bottom portion 140 having angled protrusions for aligning planting pots inserted in the compartments 110, as will hereinafter be discussed in greater detail. As shown in FIG. 5, eight compartments 110 are provided on tray 100, but of course, any number of compartments could be provided. Optionally, one or more carrying handles could be provided on the tray 100 to assist with lifting and transporting a plurality of pots. Further, a plurality of trays 100 could be stacked on top of one another for storage.

Figure 6:
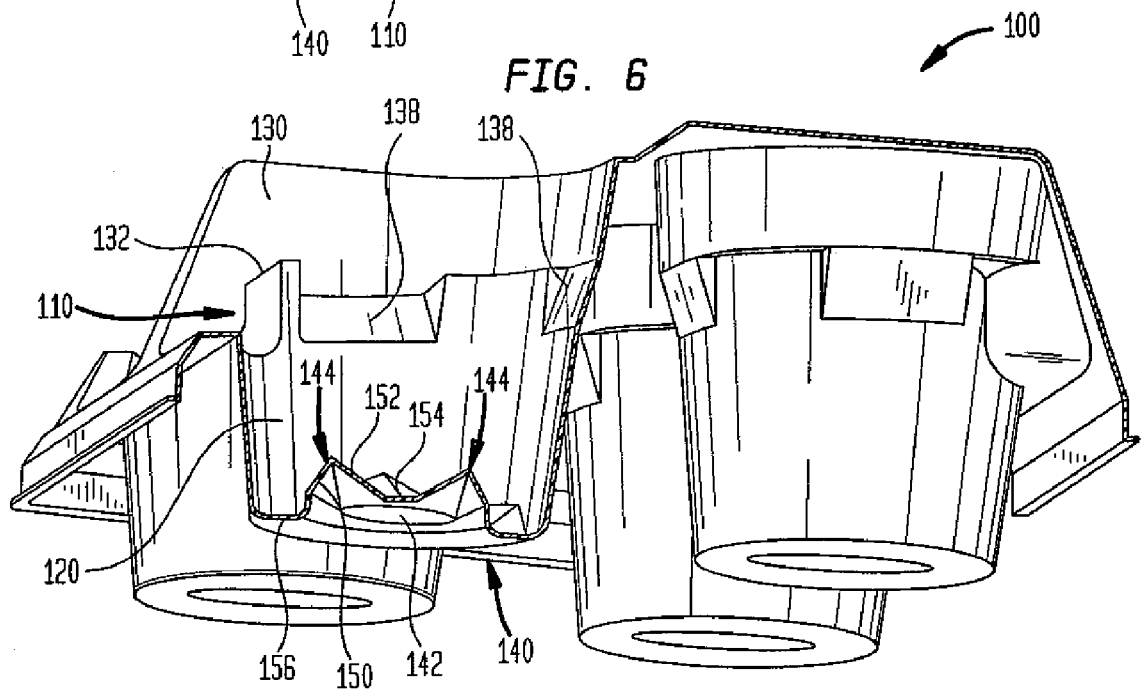
FIG. 6 is a partial isometric cross-sectional view showing one of the compartments of the multi-compartment tray of FIG. 5 in greater detail.

FIG. 6 is a partial isometric cross-sectional view showing one of the compartments 110 of the multi-compartment tray 100 in greater detail. The bottom portion 140 of the compartment 110 includes a center portion 142, about which a plurality of alignment protrusions 144 are disposed radially. Each of the alignment protrusions 144 includes angled surfaces 152 and 154, and radial surface 150, joined at edges to form a tapered protrusion. In operation, the bottom portion of a planting pot, such as the bottom portion 40 of the planting pot 10 shown in FIGS. 1-4 and described earlier, is positioned against the alignment protrusions 144 when the pot 10 is inserted into the compartment 110. If alignment is not perfect, gravitational force causes the surfaces of the alignment recesses 44 of the pot 10 to slide against the surfaces of the alignment protrusion 144. The sliding action of the recesses 44 against the protrusions 144 imparts a rotational force against the pot 10, causing same to rotate as the recesses 44 slide down the protrusions 144. The rotational force urges the pot 10 into alignment, thus self-orienting the pot 10.

The pot 10 can be urged to orient in a desired direction by altering the angle at which the pot 10 falls into the compartment 110 of the tray 100. For example, the pot 10 can be urged to self-orient to the right (e.g., twist to the right upon placement into the tray) if the pot 10 is dropped into the compartment 110 at an angle with reference to the normal of the tray 100. Further, the pot 10 can be urged to self-orient to the left if the pot 10 is dropped into the compartment 110 at a different angle with reference to the normal of the tray 100.

A channel 156 could optionally be provided to retain fluid drained from the pots inserted into the compartments. It is conceivable that one or more apertures could be provided on the channel 156 for allowing excess fluid to drain from both the pots and the compartments. The top portion 130 of the compartments 110 include a shoulder 132 upon which the shoulder 32 of the pot 10 can rest when placed in the compartment 110. Preferably, the shoulder 132 and the upper part of the body portion 120 include bevels 138 for providing room for accommodating one or more identification tags inserted into the slots 34 of the pot 10 when the pot 10 is positioned in the compartment 110. Importantly, when identification tags are utilized with present invention, the tags are self-oriented to face a uniform direction when the pot 10 is oriented by the alignment protrusions 144 and alignment recesses 44. This obviates the need for manually rotating the pots to face the tags in a uniform direction, and makes possible the automated (e.g., via an automated device in a conveyor line) placement of a plurality of pots into the tray 100.

Figure 7:
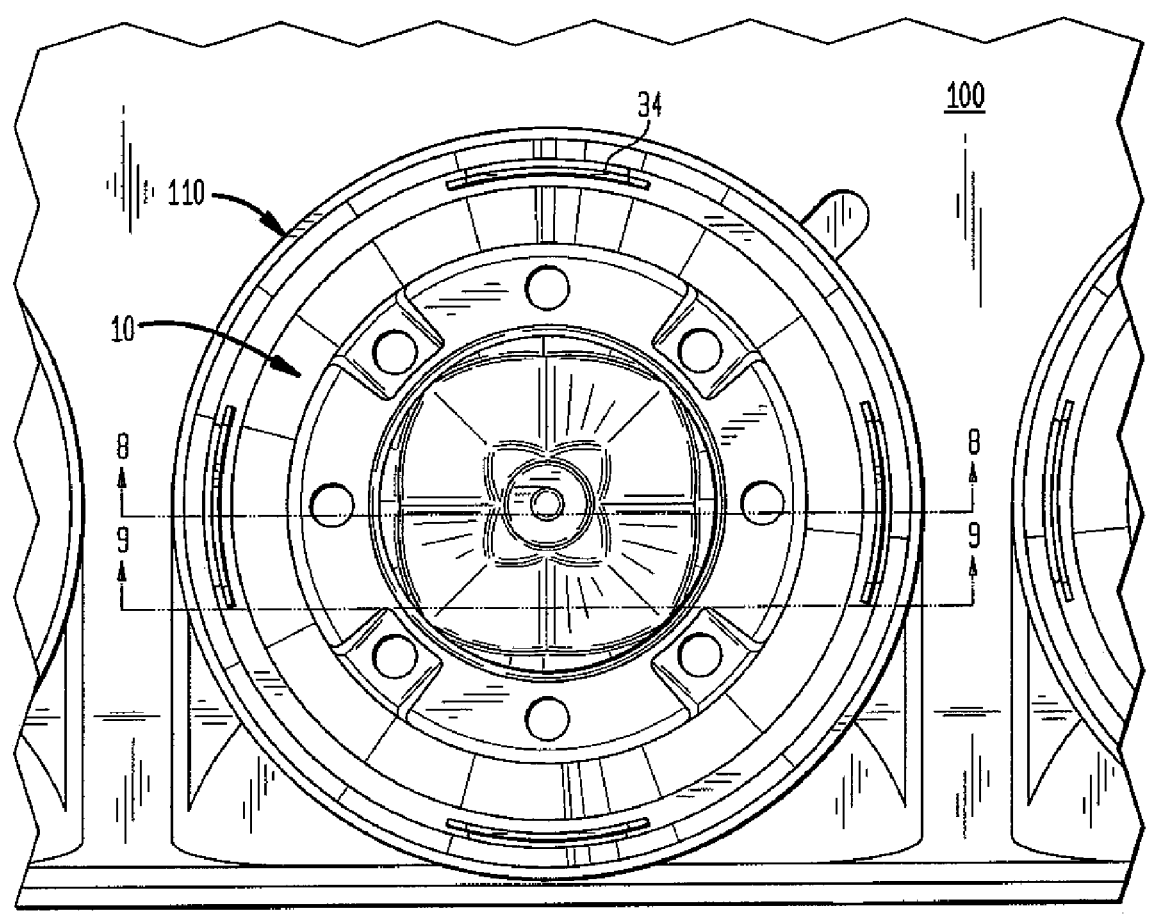
FIG. 7 is a top view of the planting pot of the present invention positioned in a compartment of the multi-compartment tray.
Figure 10:
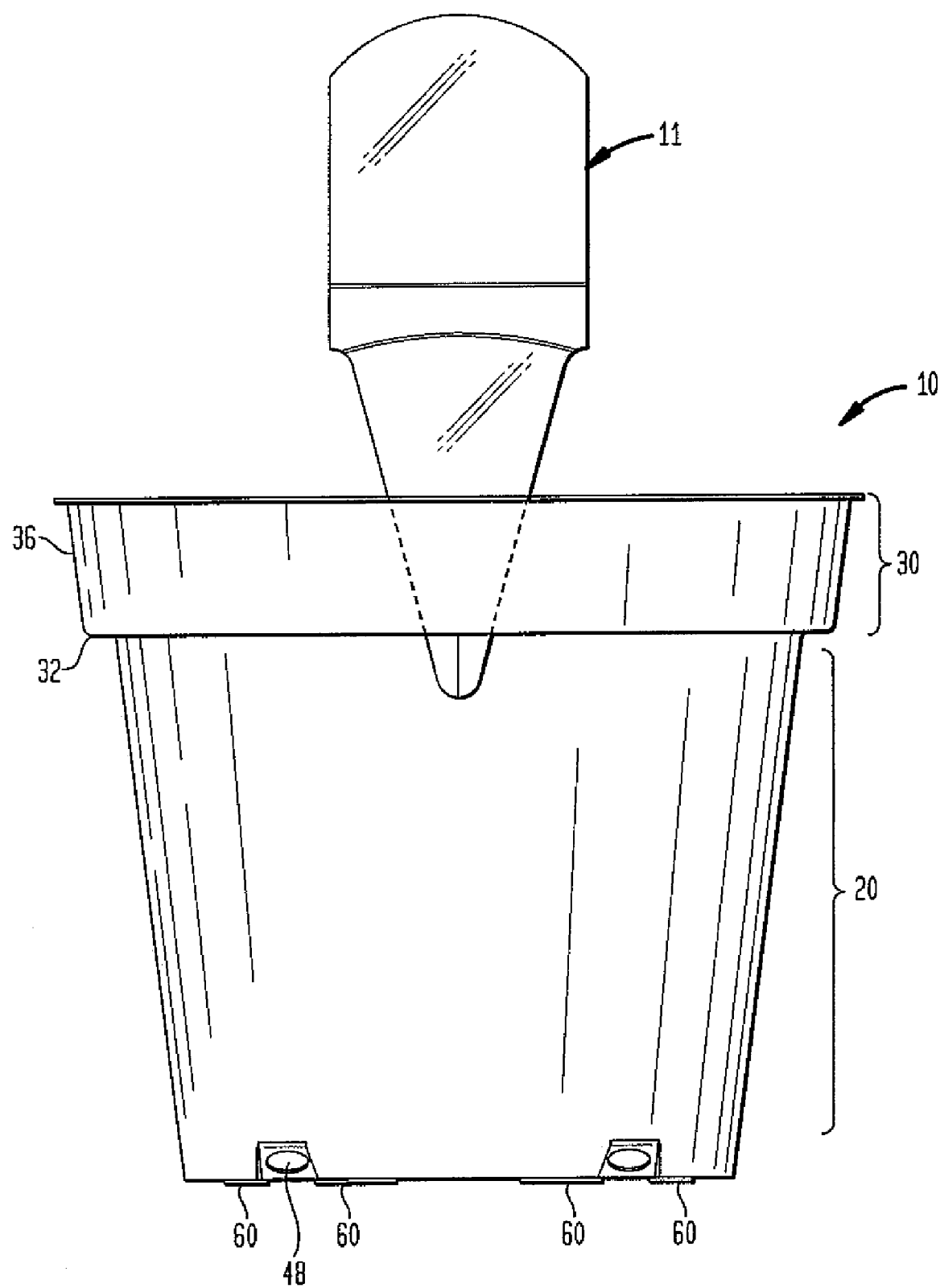
FIG. 10 is a front view of the planting pot of FIG. 1 with a plant tag.

FIG. 7 is a top view of the pot 10 of the present invention, positioned in a compartment 110 of the multi-compartment tray 100. The plurality of alignment recesses of the pot 10 co-act with the plurality of alignment protrusions of the compartment 110 to urge the pot 10 into proper alignment. By urging the pot into alignment, one or more identification tags provided in the slots 34 are automatically configured to face in a uniform direction, without requiring human intervention to achieve such alignment. This results in a decrease in the amount of human labor required when assembling pots into trays, thereby reducing the costs associated with such labor. An identification tag 11 is shown with a pot 10 in FIG. 10.

Figure 8:
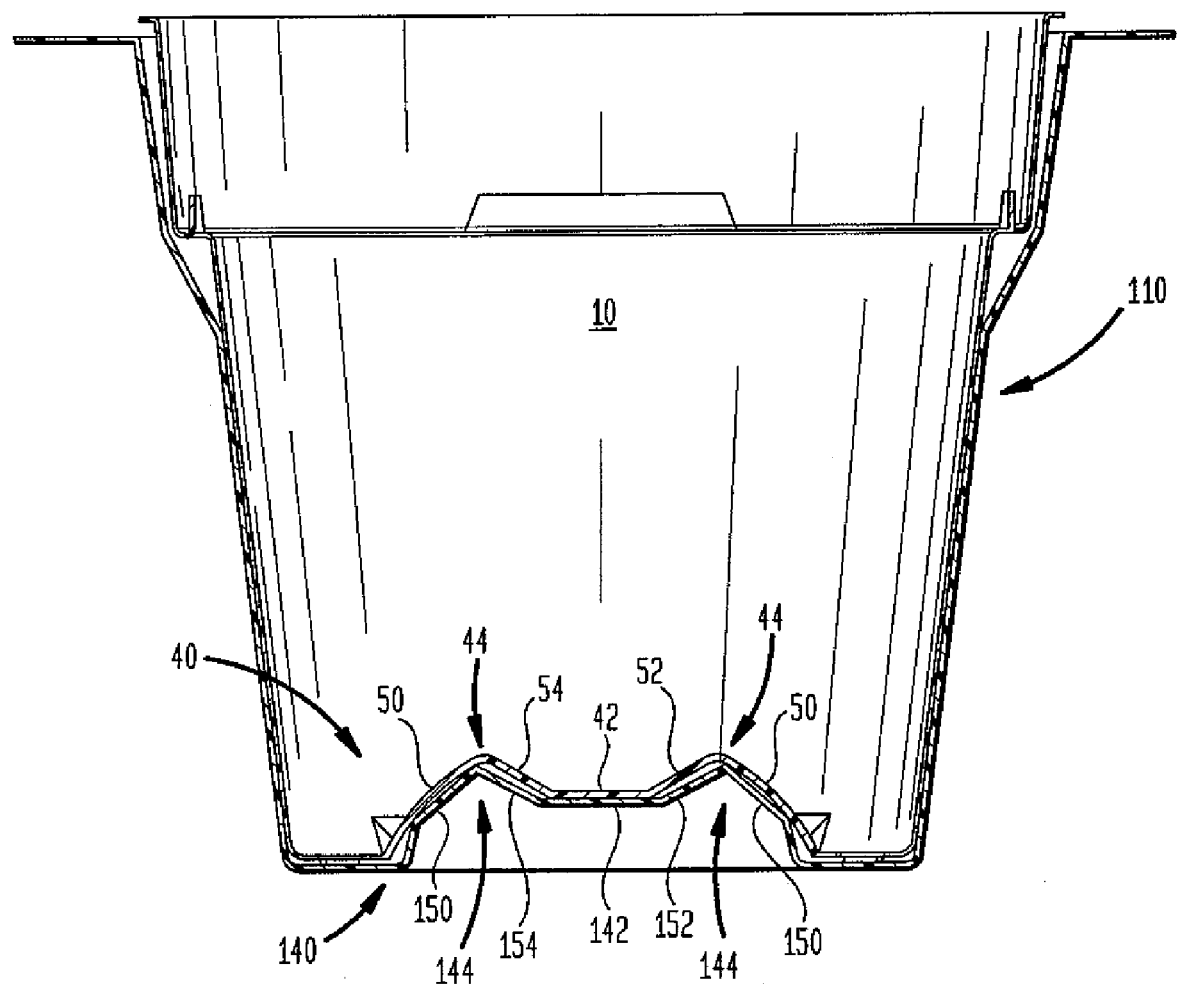
FIG. 8 is a cross-sectional view of the planting pot and compartment of FIG. 7, taken along the line 8-8.

FIG. 8 is a cross-sectional view of the planting pot and compartment of FIG. 7, taken along the line 8-8. The alignment recesses 44 of the bottom surface 40 pot 10 co-act and mate with the alignment protrusions 144 of the bottom surface 140 of the compartment 110 to urge the pot 10 into proper alignment. The angled surfaces 52 and 54 of the recesses 44, in addition to the radial surfaces 50, slide against the angled surfaces 152 and 154 and radial surfaces 150 of the compartment 110 to urge the pot 10 into alignment when same is placed within the compartment 110. The central portion 42 of the pot 10 is centered above the central portion 142 of the compartment 110.

Figure 9:
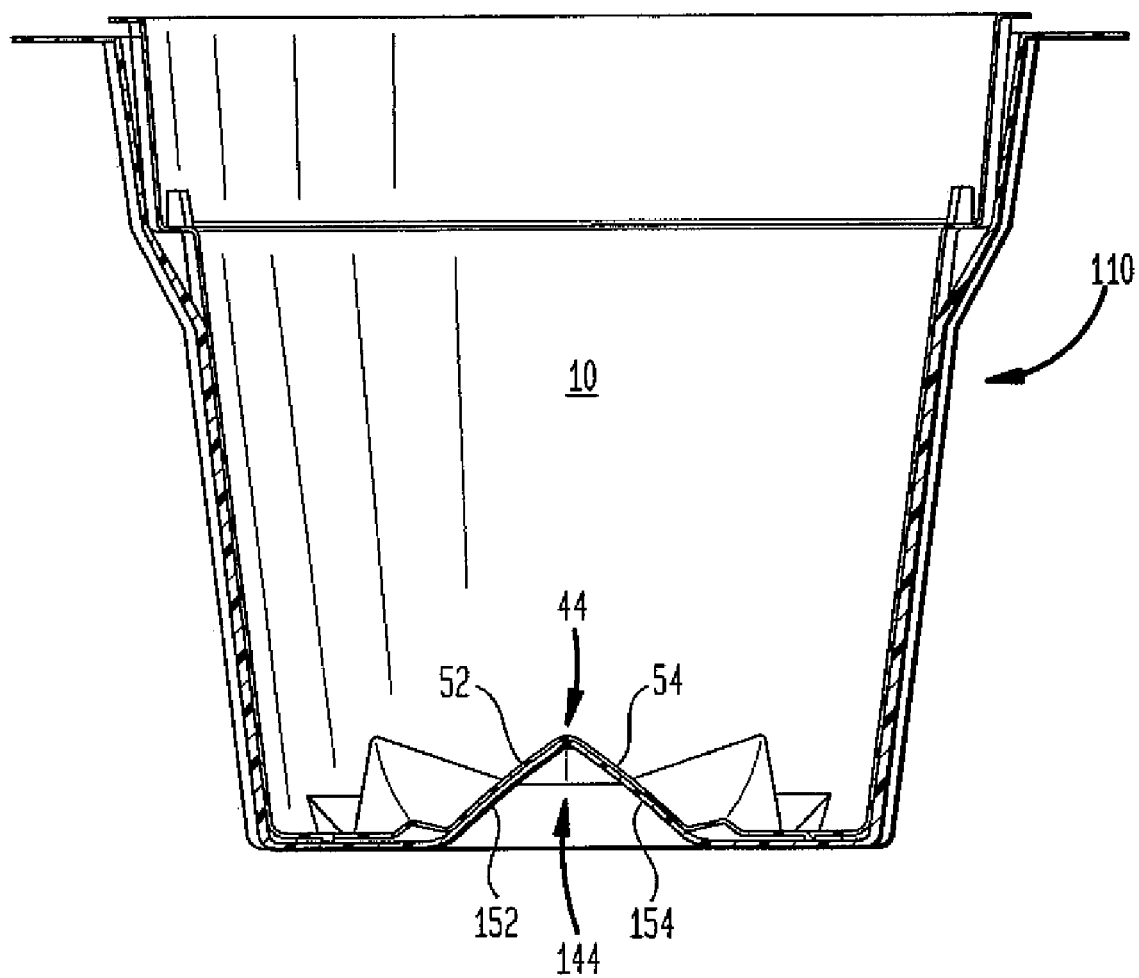
FIG. 9 is a cross-sectional view of the planting pot and compartment of FIG. 7, taken along the line 9-9.

FIG. 9 is a cross-sectional view of the planting pot and compartment of FIG. 7, taken along the line 9-9. In this view, only a single alignment recess 44 and protrusion 144 is shown in cross-section. As can be seen, the angled surfaces 52 and 54 of the recess 44 co-act with the angled surfaces 152 and 154 of the recess 144 to urge the pot 10 into proper alignment when the pot 10 is placed in the compartment 110 of the multi-compartment tray of the present invention.

Having thus described the invention in detail, it is to be understood that the foregoing description is not intended to limit the spirit and scope thereof. What is desired to be protected by Letters Patent is set forth in the appended claims.

What is claimed is:

1. A method for orienting a planting pot comprising:
obtaining a planting pot having indicia on a side of the pot and a plurality of alignment recesses on a bottom portion of the pot, each of the recesses including first and second angled surfaces joined at a radially oriented upper end;
positioning the pot above a compartment of a tray, the tray having a plurality of compartments, each compartment having alignment protrusions on a bottom portion of the compartment, each of the protrusions including first and second angled surfaces joined at a radially oriented upper end, the angled surfaces of the alignment recesses of the pot matching the angled surfaces of the alignment protrusions of the tray;
releasing the pot; and
allowing the pot to move in a downward direction such that the weight of the pot causes the angled surfaces of the alignment recesses of the pot to contact and slide along the angled surfaces of the alignment protrusions of the tray to align the indicia in an outwardly facing direction with respect to the outer perimeter of the tray.

2. The method of claim 1, wherein the step of allowing the angled surfaces of the alignment recesses of the pot to contact and slide along the angled surfaces of the alignment protrusions of the tray comprises allowing the weight of the pot to cause the angled surfaces of the alignment recesses to slide against the angled surfaces of the alignment protrusions along a horizontal direction and a vertical direction to align the indicia in a generally forward facing direction with the indicia positioned to be aligned with an edge of the tray.

3. The method of claim 1, further comprising the step of inserting an identification tag into a slot of a shoulder of the pot.

4. The method of claim 3, wherein the identification tag is automatically oriented when the pot is urged into a desired configuration.

5. The method of claim 1, wherein the step of positioning the pot in a compartment of a tray comprises placing the pot in the compartment without having to align the alignment recesses with the alignment protrusions.

6. A method for orienting a planting pot comprising:
obtaining a planting pot having a tag slot and a plurality of alignment recesses on a bottom portion of the pot ;
positioning the pot above a compartment of a tray, the tray having a plurality of compartments, each compartment having alignment protrusions on a bottom portion of the compartment
releasing the pot; and
allowing the pot to move in a downward direction such that the weight of the pot causes the alignment recesses to contact and slide along the alignment protrusions along a horizontal direction and a vertical direction to align the tag slot in an outwardly facing direction with respect to the outer perimeter of the tray.

7. The method of claim 6, wherein the pot is urged into alignment when the pot is positioned in the compartment.

8. The method of claim 7, wherein the step of positioning the pot in a compartment of a tray comprises placing the pot in the compartment without having to align the alignment recesses with the alignment protrusions.

9. The method of claim 8, further comprising the step of inserting an identification tag into the tag slot of a shoulder of the pot.

10. The method of claim 9, wherein the identification tag is automatically oriented when the pot is urged into a desired configuration.

11. The method of claim 6, wherein the protrusions are disposed radially on a bottom portion of the compartment, and the plurality of protrusions include first and second sloped surfaces.

12. The method of claim 11, wherein the pot is oriented in a generally forward facing direction in the tray.

13. The method of claim 6, wherein the step of positioning the pot comprises positioning a forward face of the pot in misalignment with a forward face of the tray, the misalignment being less than 45 degrees out of alignment, the recesses and protrusions sliding along each other in a horizontal and vertical direction to orient the pot in the tray.

* * * * *

UNITED STATES PATENT AND TRADEMARK OFFICE
CERTIFICATE OF CORRECTION

| | | |
|---|---|---|
| PATENT NO. | : 7,673,417 B2 | Page 1 of 1 |
| APPLICATION NO. | : 12/179827 | |
| DATED | : July 25, 2008 | |
| INVENTOR(S) | : Thomas J. Smith and Henry L. Huntington | |

It is certified that error appears in the above-identified patent and that said Letters Patent is hereby corrected as shown below:

Column 4, line 1, the word "includes" should be deleted, and should be replaced with the word "include."

Column 6, line 30, a --;-- should be inserted after the word "compartment."

Signed and Sealed this

Twenty-second Day of June, 2010

David J. Kappos
*Director of the United States Patent and Trademark Office*